(12) United States Patent
Demaus et al.

(10) Patent No.: US 9,770,152 B2
(45) Date of Patent: Sep. 26, 2017

(54) VACUUM CLEANER

(71) Applicant: Dyson Technology Limited, Wiltshire (GB)

(72) Inventors: Antony Owen Demaus, Bristol (GB); John Scott Sutton, Gloucester (GB)

(73) Assignee: DYSON TECHNOLOGY LIMITED, Malmesbury, Wiltshire (GB)

( * ) Notice: Subject to any disclaimer, the term of this patent is extended or adjusted under 35 U.S.C. 154(b) by 0 days.

(21) Appl. No.: 14/878,776

(22) Filed: Oct. 8, 2015

(65) Prior Publication Data
US 2016/0100730 A1    Apr. 14, 2016

(30) Foreign Application Priority Data

Oct. 8, 2014  (GB) .................................. 1417812.3

(51) Int. Cl.
*A47L 9/16* (2006.01)
*B01D 45/16* (2006.01)
*B04C 9/00* (2006.01)

(52) U.S. Cl.
CPC ............ *A47L 9/1641* (2013.01); *A47L 9/165* (2013.01); *A47L 9/1625* (2013.01); *A47L 9/1658* (2013.01); *B01D 45/16* (2013.01); *B04C 9/00* (2013.01); *B04C 2009/008* (2013.01)

(58) Field of Classification Search
CPC ...... A47L 9/1641; A47L 9/165; A47L 9/1625; A47L 9/1658; B04C 9/00; B04C 2009/008; B01D 45/16

USPC .............................. 55/459.1, DIG. 3; 15/353
IPC ......................................................... A47L 9/16
See application file for complete search history.

(56) References Cited

U.S. PATENT DOCUMENTS

| 5,558,697 A | 9/1996 | Dyson et al. |
| 2010/0242208 A1 | 9/2010 | Gammack et al. |

FOREIGN PATENT DOCUMENTS

| GB | 2 315 231 | 1/1998 |
| JP | 2014-108281 | 6/2014 |
| WO | WO-94/00046 | 1/1994 |
| WO | WO-2012/001387 | 1/2012 |

OTHER PUBLICATIONS

International Search Report and Written Opinion mailed Nov. 30, 2015 directed towards International Application No. PCT/GB2015/052678; 10 pages.
Search Report dated Mar. 30, 2015, directed to GB Application No. 1417812.3; 1 page.

*Primary Examiner* — David Redding
(74) *Attorney, Agent, or Firm* — Morrison & Foerster LLP

(57) ABSTRACT

A vacuum cleaner comprising a dirty air intake and a cyclonic separating apparatus connected in series. The cyclonic separating apparatus comprises a plurality of cyclonic separators connected in parallel. The vacuum cleaner further comprises a bleed valve provided upstream of the plurality of cyclonic separators. The bleed valve opens to admit bled air into the plurality of cyclonic separators in response to a drop in pressure in the vacuum cleaner. The bleed valve is also connected to the inlets of the plurality of cyclonic separators via a common plenum.

7 Claims, 3 Drawing Sheets

VACUUM CLEANER

REFERENCE TO RELATED APPLICATION

This application claims priority of United Kingdom Application No. 1417812.3, filed on Oct. 8, 2014, the entire contents of which are incorporated herein by reference.

FIELD OF THE INVENTION

The present invention relates to a vacuum cleaner. More particularly the present invention relates to a vacuum cleaner having a bleed valve.

BACKGROUND OF THE INVENTION

During normal use, the airflow through a vacuum cleaner can be disrupted. Such disruptions may be caused by blockages or a narrowing of the point of entry of the airflow into the vacuum cleaner, i.e. the cleaner head, tool or wand. However, the airflow may also be disrupted by blockages within the vacuum cleaner such as blockages in the filters or a blockage in a stage of separation. These disruptions result in a reduced flow rate of air through the vacuum cleaner and also a lowering of pressure within the vacuum cleaner.

Typically, the airflow is used to cool the electric motor housed within the vacuum cleaner. Thus, one problem often associated with a reduction of airflow caused by a disruption is that the electric motor of the vacuum cleaner can over heat and become damaged. To avoid this problem, vacuum cleaners may be fitted with a bleed valve that is configured to open when a blockage occurs. Generally, bleed valves are actuated when the pressure within the vacuum cleaner drops below a certain level. Once the bleed valve has opened, air is bled from outside the vacuum into the airflow path so that a minimum airflow to cool the motor is maintained. Ideally, the bleed valve is placed at a position that is as close to the motor as possible to allow for rapid cooling of the motor if necessary.

SUMMARY OF THE INVENTION

The present invention provides a vacuum cleaner comprising a dirty air intake and a cyclonic separating apparatus connected in series, the cyclonic separating apparatus comprising a plurality of cyclonic separators connected in parallel, the vacuum cleaner further comprising a bleed valve provided upstream of the plurality of cyclonic separators, wherein the bleed valve opens to admit bled air into the plurality of cyclonic separators in response to a drop in pressure in the vacuum cleaner, and wherein the bleed valve is connected to the inlets of the plurality of cyclonic separators via a common plenum.

The bleed valve is opened by a drop in pressure. The upstream position of the bleed valve relative to the plurality of cyclonic separators allows for bled air to be fed into the plurality of cyclonic separators if a blockage occurs. Thus, an airflow can be continually maintained in each of the plurality of cyclonic separators, despite the blockage. This helps to prevent dirt from settling in the cyclonic separators and clogging the cyclonic separators.

The bleed valve of the present invention is connected to the inlets of a plurality of cyclonic separators via a common plenum. By connecting the bleed valve to the inlets of a plurality of cyclonic separators via the common plenum, air can be bled through all of the plurality of cyclonic separators simultaneously using only a single bleed valve.

The plurality of cyclonic separators may be frusto-conical cyclones and each cyclonic separator may comprise a rigid portion and a flexible portion. The rigid portion may include the inlet that is connected to the common plenum and the flexible portion may comprise a dirt outlet. In this embodiment, the flexible portion is narrower than the rigid portion and in use, the flexible portion of each cyclonic separator vibrates as an airflow passes through the cyclonic separating apparatus.

An airflow passing through each of the plurality of cyclonic separators oscillates and/or vibrates the flexible nozzle tip. The oscillations and/or vibrations act to dislodge or free any trapped dirt. This movement avoids dirt building up and clogging in the narrower tips of the cyclonic separator.

It is particularly desirable to maintain an airflow through the plurality of cyclonic separators with flexible nozzle tips at all times to keep the cyclonic separators from clogging. If the airflow into the plurality of cyclonic separators is disturbed then dirt may become lodged and clogged and the flexible nozzle tip may not be able to oscillate and/or vibrate to clear the dirt. The cyclonic separators may then require the end-user to manually dislodge the clog before full separation efficiency of the vacuum cleaner can be regained.

In an extreme example, the plurality of cyclonic separators may become clogged by the lodged dirt to such an extent that they present a new blockage in the vacuum cleaner which cannot be cleared without dismantling the cyclonic separating apparatus. It is therefore advantageous in the event of an upstream blockage to have a vacuum with a bleed valve that allows an airflow to the oscillating and/or vibrating tips of the plurality of cyclonic separators.

The bleed valve and common plenum may be positioned on the cyclonic separating apparatus. A benefit from having both the bleed valve and the common plenum on the cyclonic separating apparatus is that a bled airflow can be introduced as close as possible to the plurality of cyclonic separators. This means that there is minimal time loss between the disruption of an airflow and the introduction of an auxiliary bled airflow through the plurality of cyclonic separators, helping to reduce the risk of the cyclonic separators becoming clogged.

The cyclonic separating apparatus may be a multi-stage cyclonic separating apparatus comprising a first stage of separation and a second stage of separation, wherein the second stage comprises the plurality of cyclonic separators.

The first stage may comprise a single or a plurality of cyclonic separators. Conversely, the first stage may also comprise a filter arrangement or other means of separating dirt from an airflow.

When the cyclonic separating apparatus has two stages, the bleed valve may be positioned downstream of the first stage of separation and upstream of the second stage of separation.

In effect, the bleed valve is positioned between the two stages of separation and not upstream of both separation stages. In this arrangement, a direct flow of bled air is available to the plurality of cyclonic separators if the intake or the first stage of separation becomes blocked.

When the cyclonic separating apparatus has two stages, the common plenum may also be connected to an outlet of the first stage of separation. In this arrangement, the common plenum may be integrated into the cyclonic separating apparatus so that during normal use the common plenum intakes the dirty airflow passing through the cyclonic separating apparatus and distributes the airflow to the plurality of cyclonic separators. This arrangement is favoured for multi-stage cyclonic separating apparatus as the bleed valve, common plenum and stages of separation can be spatially arranged in the cyclonic separating apparatus more efficiently and effectively as a separate compartment for the common plenum is not required.

Although any suitable type of bleed valve is envisaged to function as part of the present invention, the bleed valve may be spring loaded. The spring can be biased against an inlet and set at a threshold so that a drop in a pressure in the vacuum cleaner to a predetermined level is enough to actuate the bleed valve to open against the bias of the spring. An advantage to a spring arrangement is that it can be pre-set and varied to allow for a minimum airflow rate through the plurality of cyclonic separators.

BRIEF DESCRIPTION OF THE DRAWINGS

In order that the present invention may be more readily understood, an embodiment of the invention will now be described, by way of example, with reference to the accompanying drawings, in which:

FIGS. 1 to 3 each show a schematic of a vacuum cleaner 1, 10, 20.

DETAILED DESCRIPTION OF THE INVENTION

Figure 1:
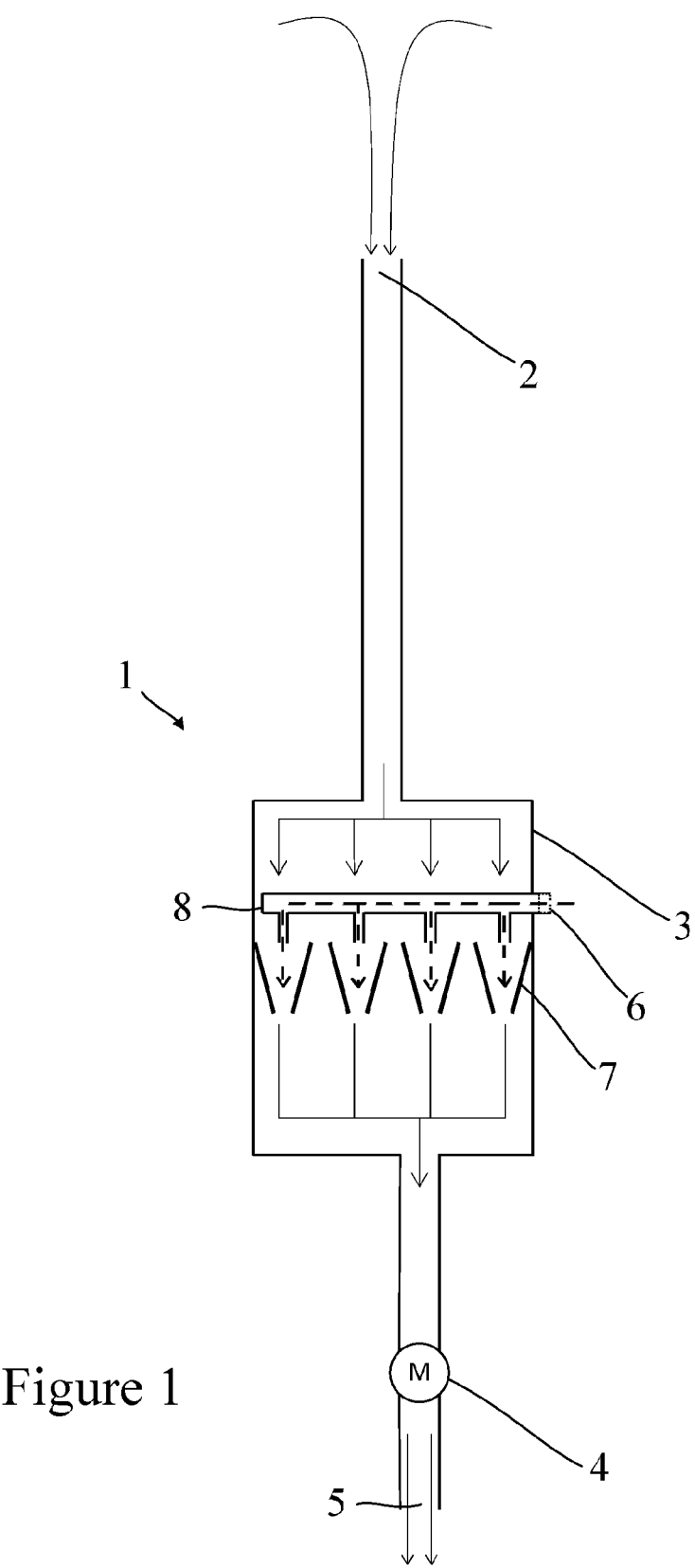
FIG. 1 is a schematic showing an embodiment of the present invention.
Figure 2:
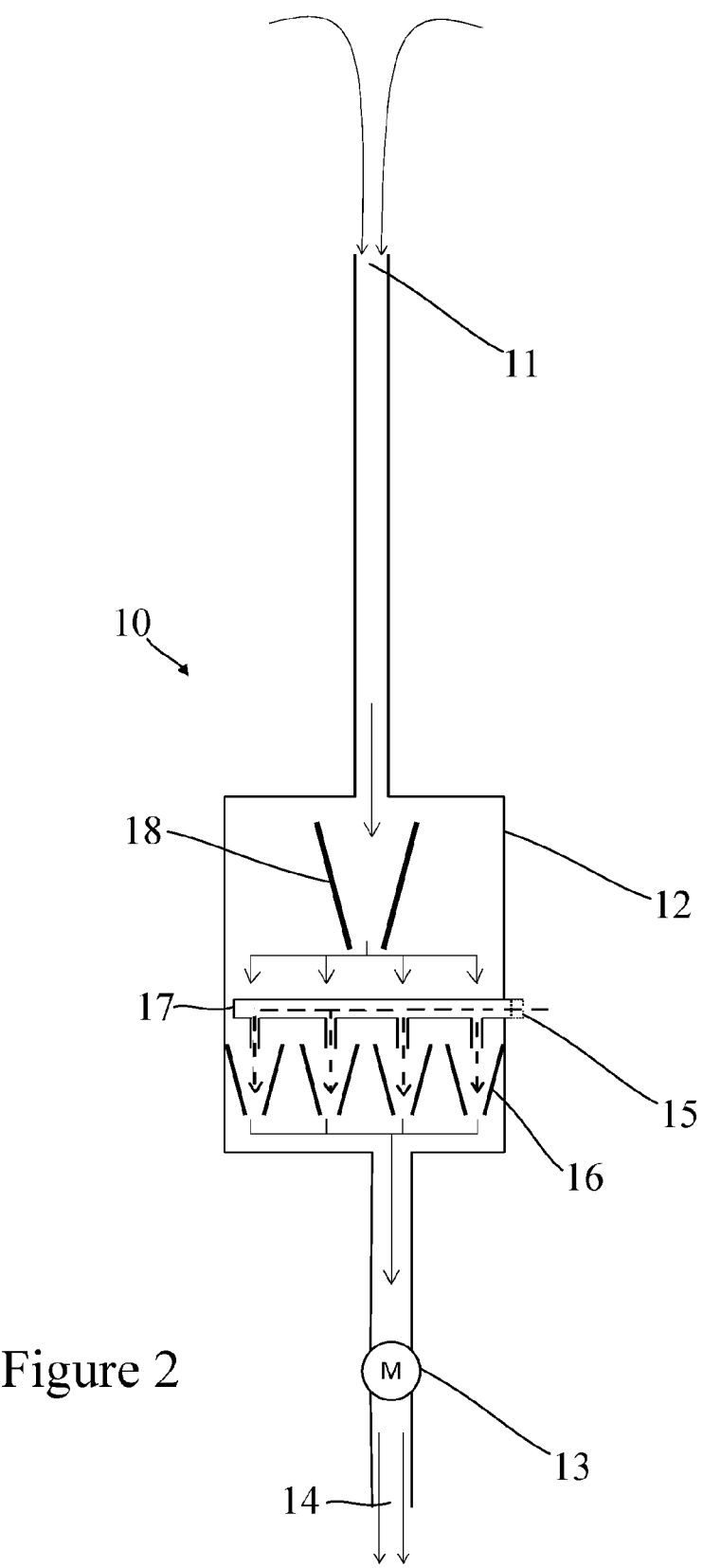
FIG. 2 is a schematic showing an alternative embodiment of the present invention.
Figure 3:
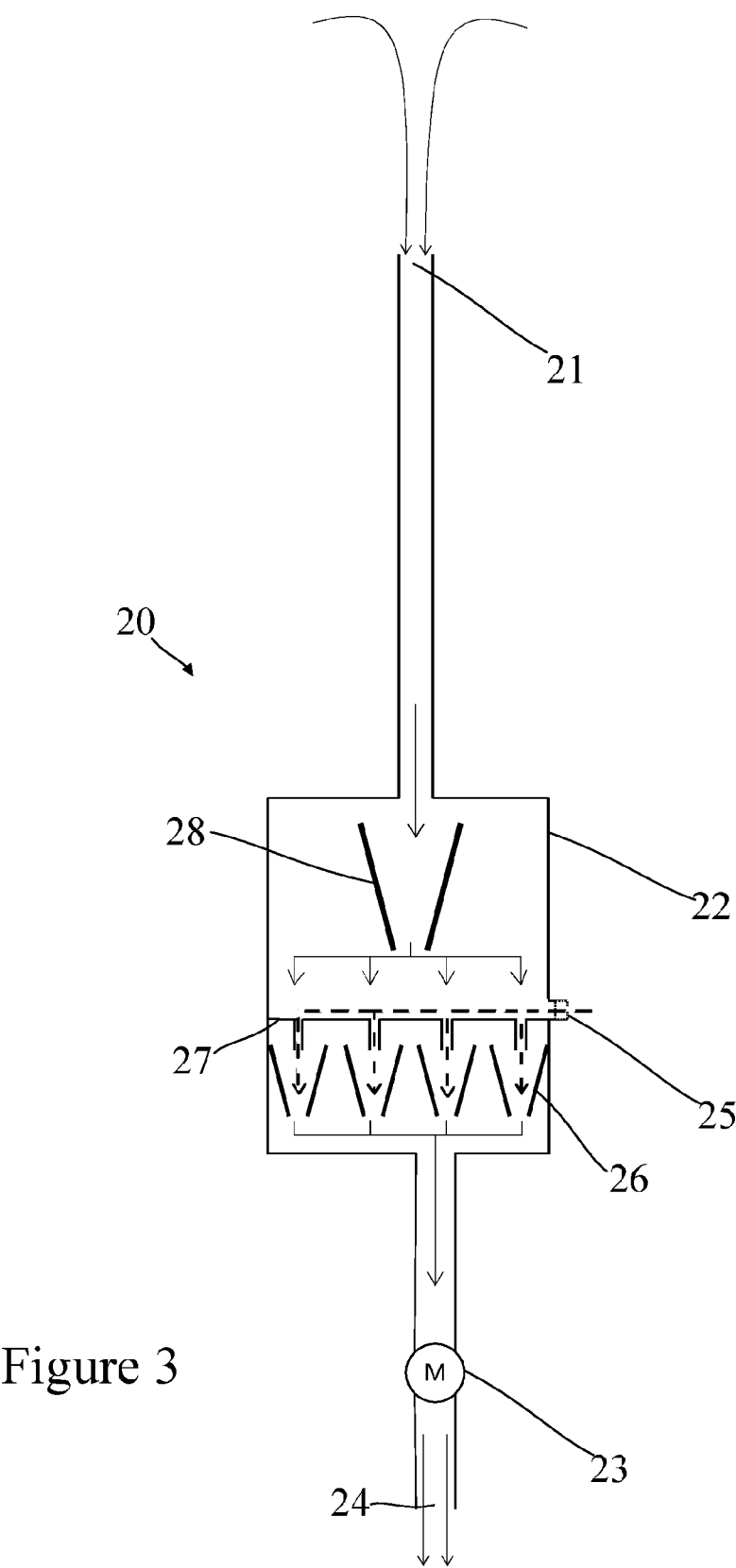
FIG. 3 is a schematic showing a further alternative embodiment of the present invention.

The vacuum cleaners 1, 10, 20 schematically depicted in FIGS. 1 to 3 each comprise a dirty air intake 2, 11, 21 a cyclonic separating apparatus 3, 12, 22 a motor 4, 13, 23 and a clean airflow exhaust 5, 14, 24. Each vacuum cleaner 1, 10, 20 also comprises a bleed valve 6, 15, 25 that can open to allow bled air into vacuum cleaner 1, 10, 20 via a common plenum 8, 17, 27. Each vacuum cleaner 1, 10, 20 may also comprise further filters, tools and attachments. However, for simplicity those features have been omitted from the figures.

During normal use of each of the arrangements shown in FIGS. 1 to 3, the expected flow of air through each vacuum cleaner 1, 10, 20 is shown by the use of solid arrows. In the event of a blockage to the airflow in each vacuum cleaner 1, 10, 20, the flow of bled air is shown by the use of a dashed arrow.

The cyclonic separating apparatus 3, 12, 22 of each of the vacuum cleaners 1, 10, 20 shown in FIGS. 1 to 3 comprises a plurality of cyclonic separators 7, 16, 26 which are arranged in a parallel configuration.

The plurality of cyclonic separators 7, 16, 26 may be rigid or comprise a rigid and flexible section. Document WO 2012/001387 provides an example of suitable cyclonic separators with a rigid and flexible section. In a preferred embodiment the plurality of cyclonic separators 7, 16, 26 comprises a plurality of frusto-conical cyclones each having a relatively wide, rigid frusto-conical portion and a relatively narrow, flexible frusto-conical portion connected to the relatively wide portion. In this embodiment, the relatively wide portion comprises a dirty air inlet and the relatively narrow portion comprises a dirt outlet.

In each of the figures, the outline of four parallel cyclonic separators 7, 16, 26 is shown in the cyclonic separating apparatus 3, 12, 22 as an example. However, it is envisaged that the number of cyclonic separators making up the plurality of cyclonic separators 7, 16, 26 could be more or less than four.

During use of the arrangement shown in FIG. 1, a dirty airflow is introduced into the vacuum cleaner 1 via the dirty air intake 2. The airflow is drawn through the vacuum cleaner 1 by a motor driven impeller (not shown). The airflow reaches the cyclonic separation apparatus 3 and dirt is separated using the plurality of cyclonic separators 7. The cleaned airflow then passes to a conduit housing the motor 4. The cleaned airflow acts as a cooling fluid for the motor 4 by passing through the conduit and over or through a heat sink arrangement on the motor (not shown) before being expelled via the clean airflow exhaust 5.

A bleed valve 6 is positioned upstream of the plurality of cyclonic separators 7 on the cyclonic separating apparatus 3. Any blockage occurring upstream of the bleed valve 6 will cause a drop in pressure in the vacuum cleaner 1 as the motor 4 will continue to expel air through the clean airflow exhaust 5. The drop in pressure will cause the bleed valve to open and allow a bled airflow to pass through the plurality of cyclone separators 7 and over or through a heat sink arrangement on the motor 4 whilst the blockage remains. Thus, the plurality of cyclone separators 7 and the motor 4 continue to receive an airflow, despite the blockage.

In order that the bleed valve 6 can feed all of the plurality of cyclonic separators 7 with air, a common plenum 8 is provided which has a connection to each of the dirty air inlets of the plurality of cyclonic separators 7. As can be seen by way of the dashed arrows, bled air entering the vacuum cleaner 1 via the bleed valve 6 is directed by the common plenum 8 to each of the inlets (not shown) of the plurality of cyclonic separators 7. Thus the common plenum 8 allows for an airflow to be maintained in each of the plurality of cyclonic separators 7, without the need to provide a plurality of bleed valves.

An alternative embodiment of the present invention is shown in FIG. 2. This alternative embodiment has a vacuum cleaner 10 with a cyclonic separating apparatus 12 that is a multi-stage cyclonic separating apparatus. The first stage comprises a single cyclonic separator 18 that is connected in series to the plurality of cyclonic separators 16 that are connected in parallel. Although single cyclonic separator 18 is shown in FIG. 2, any means that can filter coarse or large dirt could be used as a first stage. For example, a filter arrangement or plurality of cyclonic separators in parallel or series could form part of the first stage of separation.

A bleed valve 15 is positioned downstream of the first stage of separation 18 and upstream of the plurality of cyclonic separators 16. In order that the bleed valve 15 can feed all of the plurality of cyclonic separators 16 simultaneously with air, a common plenum 17 is provided which has a connection to each of the dirty air inlets of the plurality of cyclonic separators 16.

The provision of a common plenum 17 serves mainly to split the flow of incoming bled air into each of the plurality of cyclonic separators 16. In the embodiments shown in FIGS. 1 and 2, the common plenum 8, 17 forms a compartment within the cyclonic separating apparatus 3, 12. Both of the common plenums 8, 17 have a single inlet from the bleed valve 6, 15 and multiple outlets connected to each of the inlets of the plurality of cyclonic separators 7, 16. However, an alternative arrangement may comprise an integrated plenum which is also connected to the outlet or outlets of the first stage of separation, as illustrated in FIG. 3

In the alternative arrangement shown in FIG. 3, the first stage of separation in the cyclonic separating apparatus 22 comprises a single cyclonic separator 28 that is connected in series to the plurality of cyclonic separators 26 that are connected in parallel. Again, although single cyclonic separator 28 is shown, any means that can filter coarse or large dirt could be used as a first stage. For example, a filter arrangement or plurality of cyclonic separators in parallel or series could form part of the first stage of separation.

A bleed valve 25 is positioned downstream of the first stage of separation 28 and upstream of the plurality of cyclonic separators 26. In order that the bleed valve 25 can feed all of the plurality of cyclonic separators 26 simultaneously with air, a common plenum 27 is provided which has a connection to each of the dirty air inlets of the plurality of cyclonic separators 26.

In this alternative arrangement, the common plenum 27 is integrated into the cyclonic separating apparatus 22. The airflow from the outlet of the first stage of separation 28 is fed through the common plenum 27 and then into the plurality of cyclonic separators 26 through parallel inlets. The same parallel inlets are also used to feed bled air into the plurality of cyclonic separators 26 if the airflow into the vacuum cleaner 20 becomes blocked.

In addition, further stages of separation may also be included within the cyclonic separating apparatus 22. For example, a first stage may comprise a filter arrangement, a second stage may comprise a single cyclonic separator and a third stage may comprise a plurality of cyclonic separators connected in parallel.

The invention claimed is:

1. A vacuum cleaner comprising a dirty air intake and a cyclonic separating apparatus connected in series, the cyclonic separating apparatus comprising a plurality of cyclonic separators connected in parallel, the vacuum cleaner further comprising a bleed valve provided upstream of the plurality of cyclonic separators, wherein the bleed valve opens to admit bled air into the plurality of cyclonic separators in response to a drop in pressure in the vacuum cleaner, the bleed valve is connected to the inlets of the plurality of cyclonic separators via a common plenum, the plenum has a single inlet, and the bleed valve is connected to the single inlet.

2. The vacuum cleaner of claim 1, wherein the plurality of cyclonic separators are frusto-conical cyclones, each cyclonic separator comprising a rigid portion and a flexible portion, the rigid portion comprises the inlet connected to the common plenum, and the flexible portion comprises a dirt outlet, wherein the flexible portion is narrower than the rigid portion such that, in use, the flexible portion of each cyclonic separator vibrates as an airflow passes through the cyclonic separating apparatus.

3. The vacuum cleaner of claim 1, wherein the bleed valve is positioned on the cyclonic separating apparatus.

4. The vacuum cleaner of claim 1, wherein the cyclonic separating apparatus is a multi-stage cyclonic separating apparatus comprising a first stage of separation and a second stage of separation, wherein the second stage comprises the plurality of cyclonic separators.

5. The vacuum cleaner of claim 4, wherein the bleed valve is positioned downstream of the first stage of separation and upstream of the second stage of separation.

6. The vacuum cleaner of claim 1, wherein the bleed valve is spring loaded.

7. A vacuum cleaner comprising a dirty air intake and a cyclonic separating apparatus connected in series, the cyclonic separating apparatus comprising a plurality of cyclonic separators connected in parallel, the vacuum cleaner further comprising a bleed valve provided upstream of the plurality of cyclonic separators, wherein the bleed valve opens to admit bled air into the plurality of cyclonic separators in response to a drop in pressure in the vacuum cleaner, and wherein the bleed valve is connected to the inlets of the plurality of cyclonic separators via a common plenum, and the plenum comprises a bled air pathway that is isolated from an airflow pathway from the dirty air intake to the plurality of cyclonic separators.

* * * * *